United States Patent [19]

Getten et al.

[11] Patent Number: 5,044,850
[45] Date of Patent: Sep. 3, 1991

[54] SELF PLUGGING BLIND RIVET

[75] Inventors: Steven Getten, Albrightsville, Pa.; Carlos Castaneda, Dover, N.J.

[73] Assignee: Avdel Corporation, Parsippany, N.J.

[21] Appl. No.: 522,053

[22] Filed: May 11, 1990

[51] Int. Cl.⁵ .............................. F16B 13/04
[52] U.S. Cl. ........................ 411/43; 411/70
[58] Field of Search ............ 411/43, 34, 49, 69, 411/70, 361

[56] References Cited

U.S. PATENT DOCUMENTS

| | | | |
|---|---|---|---|
| 3,047,181 | 7/1962 | Heidenwolf | 411/70 |
| 3,377,907 | 4/1968 | Hurd | 411/70 |
| 3,523,482 | 8/1970 | Ploch | 411/49 |
| 3,880,042 | 4/1975 | Binns | 411/43 |
| 4,627,775 | 12/1986 | Dixon | 411/43 |
| 4,639,174 | 1/1987 | Denham et al. | 411/43 X |
| 4,810,142 | 3/1989 | Briles | 411/34 X |
| 4,907,922 | 3/1990 | Jeal et al. | 411/43 |

FOREIGN PATENT DOCUMENTS

| | | | |
|---|---|---|---|
| 209951 | 8/1957 | Australia | 411/43 |
| 1377442 | 9/1964 | France | 411/43 |
| 2587768 | 3/1983 | France | 411/43 |

*Primary Examiner*—Rodney M. Lindsey
*Assistant Examiner*—Jerry Redman
*Attorney, Agent, or Firm*—Oblon, Spivak, McClelland, Maier & Neustadt

[57] ABSTRACT

The self plugging blind rivet with a large grip range includes a tubular shell having a head at one end and an elongate shank portion which includes axial slits for permitting the shank portion to expand radially to form a blind head. The bore extends through the head and the shank portion and includes a shoulder at a midportion thereof to form a locking portion of reduced diameter. A stem is fitted in the bore of the tubular shell and includes a head positioned adjacent the another end of the shell, as well as a shank having a breakneck. A shoulder formed adjacent the stem head has an enlarged diameter swaging portion, while a split ring is formed on the stem shank between the breakneck and the swaging portion. During the setting of the rivet, the swaging portion deforms the locking portion of the shell so that the material thereof flows around the split ring for locking the stem within the set rivet. A taper portion of the shell bore accepts excess material from the locking portion to increase the grip range of the rivet. The split ring can be formed in the same heading machine as the stem itself.

6 Claims, 2 Drawing Sheets

SELF PLUGGING BLIND RIVET

BACKGROUND OF THE INVENTION

Field of the Invention

The present invention relates to a self plugging blind rivet. More particularly, the invention relates to a self plugging blind rivet which lends itself to a wide variety of applications in both hard and soft materials while assuring superior stem retention and excellent clamp-up.

BACKGROUND OF THE RELATED ART

Self plugging blind rivets are known in a variety of forms, and generally comprise a tubular shell and a stem which extends through the bore of the tubular shell, the stem being pulled to expand the tubular shell and thereby set the rivet. At least a part of the stem acts as a plug which is left plugging the bore of the set rivet. The plug serves to close the bore and/or strengthen the rivet.

An example of such a self plugging blind rivet can be found in U.S. Pat. No. 4,355,934. There, a stem has splines which enter a reduced diameter region of the shell bore to form grooves therein, followed by a cylindrical swaging portion which swages material from the shell into those grooves to form a lock. However, this requires a relatively complex stem configuration in which the splines must be formed separately from the stem, which increases the cost of manufacture.

SUMMARY OF THE INVENTION

It is an object of the present invention to provide a self plugging blind rivet having superior stem retention.

It is a further object of the present invention to provide a self plugging blind rivet having excellent clamp-up.

It is yet a further object of the present invention to provide a self plugging blind rivet including a stem which can be entirely formed on a single heading machine.

The above, and other, objects are achieved according to the present invention by a self plugging blind rivet having a large grip range (i.e., good clamp-up), comprising a tubular shell having a head at one end, and elongate shell portion having means for permitting the shank portion to expand radially to form a blind head, and a bore extending through the head and the shank portion from the one end to another end opposite thereto. The bore has a shoulder at a midportion thereof to form a locking portion of the bore on a side of the shoulder towards the one end, the locking portion having a diameter smaller than a diameter of the bore on a side of the shoulder towards the another end. The self plugging blind rivet further includes a stem fitted in the bore of the tubular shell, the stem comprising a head positioned adjacent the another end, and a shank extending from the stem head toward one end of the shell and beyond the one end of the shell, whereby a setting tool may grip the shank to set the rivet. A breakneck is formed on the shank whereby the stem can rupture at the breakneck during the setting of the rivet. A shoulder is formed on the shank at a position between the breakneck and the head, the shoulder of the shank defining a swaging portion of the shank on a side thereof towards the head. The swaging portion has a diameter greater than that of the locking portion of the bore. Locking means are formed on the shank at a position between the shoulder of the shank and the breakneck, the locking means comprising at least one projection extending radially from the stem and having a diameter which is not greater than that of said locking portion of the bore. As a result, upon engagement of the shoulder of the shank with the shoulder of the stem during setting of the rivet, material of the shell in the locking portion is caused to flow towards the at least one projection to lock the stem in the bore.

According to a further feature of the invention, the locking means comprises a split ring having at least two ring portions projecting from the shank, each of the ring portions being separated from adjacent ring portions by a reduced diameter gap, so that material of the shell may flow through the gaps. Such ring portions can be simultaneously formed by a single blow split die wire nail press during the formation of the remainder of the stem.

According to a further feature of the invention, the ring portions are formed in a single blow, split die, wire nail press.

According to a further feature of the invention, the bore has an outward taper from the locking portion to the one end. The material of the shell may fill a space between the shell and the shank at said outward taper when clamping relatively thin materials, so that the rivet has a large grip range.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
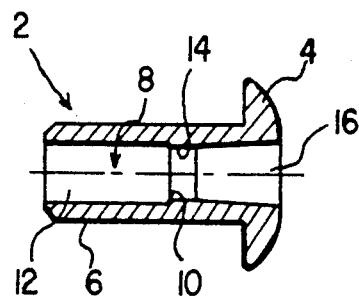
FIG. 1 is a section view of a shell of the rivet according to the invention.
Figure 2:
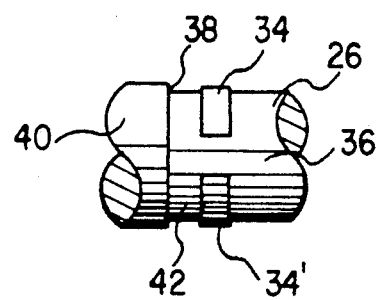
FIG. 2 is a detail illustrating the locking means.

Referring to FIG. 1, there is shown in section a tubular shell according to the present invention. The tubular shell 2 has an enlarged diameter head 4 at one end thereof and an elongate shank portion 6 extending from the head to another end thereof. The shank portion 6 has a generally cylindrically-shaped outer periphery of a constant diameter appropriate to the size of the holes in the materials to be clamped by the rivet.

A bore 8 extends through the tubular shell from the one end to the other end thereof. At a midportion along the length of the bore there is formed an annular shoulder 10, whereby the bore at a side of the shoulder towards the one end having the head 4 has a reduced diameter, compared to the portion 12 of the bore on the side of the shoulder towards the another end, thereby producing a locking portion 14 of the bore on the side of the shoulder towards the one end. This locking portion 14 has a constant diameter less than that of portion 12 and terminates at an outward taper portion 16 of the bore. This outward taper portion 16 tapers with a progressively increasing diameter toward the one end of the shell.

Figure 4:
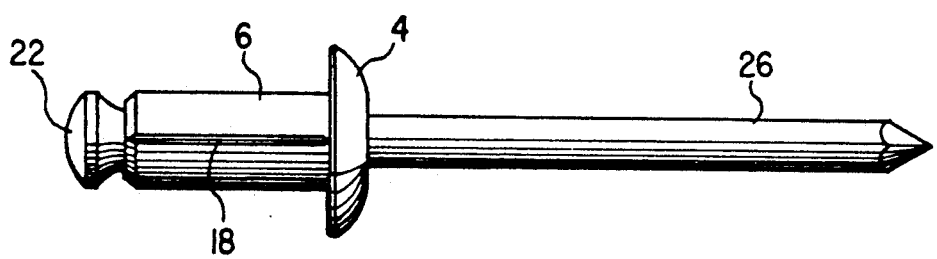
FIG. 4 shows the stem assembled to the shell.

During setting, the shank portion 6 must expand radially outward to form the blind head. The shank portion is therefore provided with means for permitting such radially outward expansion. Preferably, such means comprise longitudinally extending weakened portions formed on the shank portion 6. In the preferred embodiment, these weakened portions comprise a plurality of axially extending slits 18 in the shank portion (only one is shown in FIG. 4) extending from the another end of the shank portion to a point immediately adjacent the head 4. Preferably, there are three such slits 18 which are spaced circumferentially by 120°, however fewer or more such slits are possible.

The tubular shell 2 is preferably an extruded aluminum piece produced on a four-station cold heading machine which extrudes the shell and the bore simultaneously. The slits 18 are then formed prior to assembly of the shell with the stem. It should be noted that the formation of the slits 18 displaces some material of the shell inwardly. This displaced material is used to create an interference fit between the stem and the shell, as will be described below.

Figure 3:
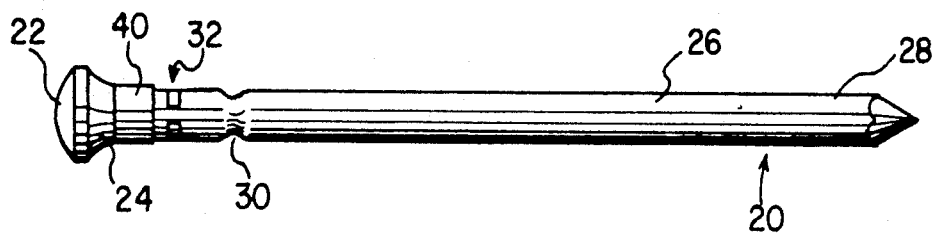
FIG. 3 is a side view of the stem according to the invention.

Referring to FIG. 3, the stem 20 has a head 22 which is normally positioned adjacent the other end of the shell 2 (see FIG. 4). The underside of the stem head 22 is radiused at 24 in order to promote the splitting of the shank portion 6 during setting.

The shank 26 of the stem extends from the head to the opposite end 28 which may be sharpened to promote insertion of the stem into the workpieces.

The stem generally has a constant diameter which is less than that of the locking portion 14 of the bore so that the stem can be inserted entirely through the bore 8 and be fitted in the position shown in FIG. 4, where the stem head 22 is positioned adjacent the another end of the shell 2. The end 28 of the stem then extends from the shell so that it may be grasped by a conventional setting tool (not shown) for setting the rivet.

A breakneck 30 is formed on the shank 26 at a position where it is desired for the stem to rupture at the end of a setting sequence. Between the breakneck 30 and the stem head 22 there is formed a locking means 32 for locking the ruptured stem in the shell after the setting operation. The locking means 32 comprises at least one projection extending radially from the stem and having a diameter which is not greater than that of the locking portion 14 of the bore. In the preferred embodiment, the locking means comprises a split ring having two semi-annular ring portions 34 and 34' which are circumferentially separated by a pair of reduced diameter gaps 36 (only one gap is shown). The ring portions 34 and 34' lie on a circle which has a diameter which is substantially the same as that of the locking portion 14 to form a sliding fit therein, but can be slightly smaller so as to form a clearance fit.

Between the locking means 32 and the stem head 22 there is provided an annular shoulder 38. The portion of the shank 26 between the annular shoulder 38 and the stem head 22 has an enlarged diameter compared to the remainder of the shank 26, thereby forming a cylindrical swaging portion 40 of the stem. The swaging portion has a diameter greater than that of the locking portion 14 of the shell, but not greater than that of the portion 12 of the shell bore 8. Preferably, the diameter of the swaging portion 40 is substantially the same as that of the portion 12 of the shell bore 8, so that the inward deformations of the shank portion 6 of the shell produced by the formation of the slits 18 create a friction fit for the swaging portion 40 within the shell. The stem can thus be held together prior to setting.

The stem 20 is preferably made of steel and headed on a Wafios nail maker using a split die process which produces the breakneck 30 and the split ring portions 34, 34'. More particularly, the stem 20 is produced on a high speed, split die, single blow wire nail press. Inserts in the split die form the multiple diameters required to produce the split ring on the stem. As the moving side of the split die moves radially inward toward the rod-like stem blank, material is displaced to form the split ring portions 34 and 34'. The gaps 36 between the ring segments facilitate the release of the parts from the stationary side of the die. Subsequently, a head punch forms the head 22, the radiused underside 24 and the swaging portion in the stem blank. The stem is then inserted within the shell and held therein by the interference fit between the bore of the shell and the swaging portion 40 of the stem. Prior to such assembly, the components may be heat-treated, plated and lubricated.

Figure 5A:
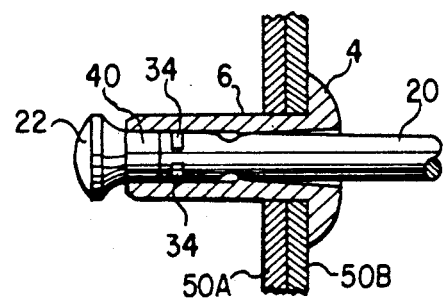
FIGS. 5A through 5E show the rivet during successive phases of a setting operation.

Referring to FIG. 5A, the assembled rivet is shown in section after insertion of the shank portion of the shell 2 in the aligned holes of workpieces 50A and 50B which are to be clamped. The swaging portion 40 of the stem 20 is then held in interference fit within the bore 8 of the shell while the split ring portions 34 and 34' are in a clearance fit within the portion 12 of the bore.

Figure 5B:
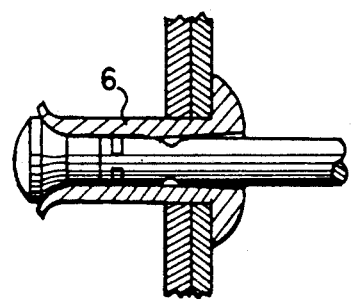
Figure 5C:
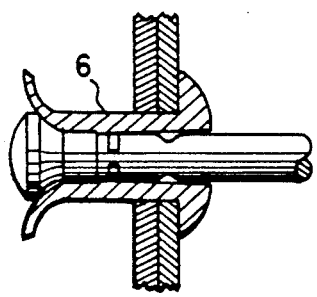

Subsequently, a setting tool grips the end 28 of the stem shank 26, while an anvil thereof retains the head 4 of the shell, in a manner which is well known. This causes the stem to move to the right (as seen in FIG. 5B) so that the stem head 22 enters the shank portion 6 of the shell. This results in the another end of the shank portion splitting radially outward at the slits, due to the progressively increasing diameter of the radiused underside of the head 22.

As the setting tool continues to pull the stem rightward relative to the shell, the split shank portion 6 continues to expand radially outward for setting the rivet. Simultaneously, the ring portions 34 and 34' of the locking means enter the locking portion 14 of the shell bore. However, since the ring portions 34 and 34' have a diameter which is not greater than that of the locking portion, the shell is not deformed thereby.

Figure 5D:
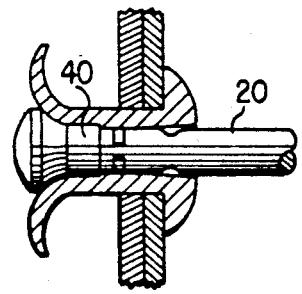

Referring to FIG. 5D, the annular shoulder 38 of the stem 20 eventually reaches the annular shoulder 10 of the shell. Since the swaging portion 40 has a diameter greater than that of the locking portion 14, the resistance of the stem to further rightward movement increases and any further such rightward movement must be accompanied by the deformation of the locking portion as the material thereof is forced to flow rightward ahead of the swaging portion 40. As it does so, it fills in the annular space 42 between the annular shoulder 38 of the stem and the ring portions 34 and 34', and so locks the stem in the shell. If the workpieces are thin, the stem must advance further to the right before the rivet is fully set and so a greater amount of the material of the locking portion is deformed during setting of the rivet. Some of this material ultimately flows through the gaps 36 to surround the split ring portions 34 and 34'.

Figure 5E:
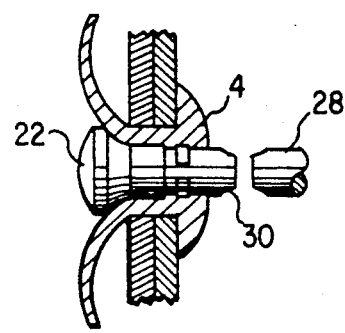

Finally, in the position of FIG. 5E, the head 22 of the stem reaches a position where further rightward movement of the stem is prevented by the walls of the workpieces 50A and 50B so that further movement of the stem relative to the shell is prevented. At this time, the shank portion 6 of the shell is split to a position abutting the workpieces, so that the rivet is fully set. Moreover, since the material of the locking portion has been forced to flow into the annular space 40, and perhaps also through the gaps 36 and around the ring portions 34 and 34', the stem is firmly locked within the shell. Additional force on the end 28 of the shank 26 of the stem causes the breakneck 30 to rupture for completing the setting operation.

It should be noted that the taper portion 16 promotes a wide grip range (good clamp-up) since, for very thin workpieces, excess material from the locking portion 14 can flow into the enlarged diameter region of the tapered portion 16, thereby avoiding premature stem breakage.

Obviously, numerous modifications and variations of the present invention are possible in light of the above teachings. It is therefore to be understood that within the scope of the appended claims, the invention may be practiced otherwise than as specifically described herein.

What is claimed is:

1. A self plugging blind rivet having a large grip range, comprising:

a tubular shell having a head at one end, an elongate shank portion having means for permitting said shank portion to expand radially to form a blind head, and a bore extending through said head and said shank portion from said one end to another end opposite thereto, wherein said bore has a shoulder at a midportion thereof to form a locking portion of said bore on a side of said shoulder towards said one end, said locking portion having a diameter smaller than a diameter of said bore on a side of said shoulder towards said another end;

a stem fitted in said bore of said tubular shell, said stem comprising a head positioned adjacent said another end, and a shank extending from said stem head toward said one end of said shell and beyond said one end of said shell, whereby a setting tool may grip said shank to set the rivet;

a breakneck formed on said shank, whereby said stem can rupture at said break neck during the setting of said rivet;

a shoulder formed on said shank at a position between said breakneck and said stem head such that said shoulder may reach said locking portion during the setting of said rivet, said shoulder of said shank defining a swaging portion of said shank on a side thereof towards said stem head, said swaging portion having a diameter greater than that of said locking portion of said bore; and locking means formed on said shank at a position between said shoulder of said shank and said breakneck, said locking means comprising at least one projection extending radially from said shank and having a diameter which is not greater than that of said locking portion of said bore, whereby upon engagement of said shoulder of said shank with said shoulder of said bore during the setting of the rivet, material of said shell at said locking portion is caused to flow towards said locking means to lock said stem in said bore, wherein said locking means comprise a split ring having at least two circumferentially extending ring portions projecting from said shank, each of said ring portions being circumferentially separated from adjacent ring portions by a reduced diameter gap, whereby said material of said shell which has been caused to flow towards said locking means may flow axially through said gaps.

2. The rivet of claim 1 wherein there are two of said ring portions.

3. The rivet of claim 1 wherein said bore has an outward taper from said locking portion to said one end, whereby said material of said shell may fill a space between said shell and said shank at said outward taper during the setting of said rivet.

4. The rivet of claim 1 wherein said ring portions are simultaneously formed in a single blow, split die, wire nail press.

5. The rivet of claim 1 wherein said means for permitting said shank portion to expand comprise a plurality of axial slits in said shank portion, said slits extending from said another end towards said one end.

6. The rivet of claim 1 wherein said swaging portion of said shank forms an interference fit with said bore prior to setting so as to maintain said shell and said stem in an assembled state.

* * * * *